(12) United States Patent
Jostschulte

(10) Patent No.: US 7,181,084 B2
(45) Date of Patent: Feb. 20, 2007

(54) DEVICE AND METHOD FOR SUB-BAND DECOMPOSITION OF IMAGE SIGNALS

(75) Inventor: Klaus Jostschulte, Dortmund (DE)

(73) Assignee: Micronas GmbH, Freiburg (DE)

( * ) Notice: Subject to any disclaimer, the term of this patent is extended or adjusted under 35 U.S.C. 154(b) by 677 days.

(21) Appl. No.: 10/252,786

(22) Filed: Sep. 23, 2002

(65) Prior Publication Data

US 2003/0086105 A1 May 8, 2003

(30) Foreign Application Priority Data

Sep. 21, 2001 (DE) ................................ 101 46 582

(51) Int. Cl.
*G06K 9/40* (2006.01)

(52) U.S. Cl. ...................... 382/260; 382/265; 382/254; 358/1.9

(58) Field of Classification Search ................ 382/240, 382/254, 302, 132, 260, 261, 262, 263, 264, 382/265; 358/1.9; 250/369; 708/301, 400; 704/212
See application file for complete search history.

(56) References Cited

U.S. PATENT DOCUMENTS

| | | | | |
|---|---|---|---|---|
| 5,430,487 A | * | 7/1995 | Naimpally | 375/240.25 |
| 5,488,421 A | | 1/1996 | Hwang et al. | 348/448 |

(Continued)

FOREIGN PATENT DOCUMENTS

DE 197 57 140 12/1997

(Continued)

OTHER PUBLICATIONS

Tekalp, M., "Noise Filtering", Digital Video Processing, Prentice Hall, Chapter 14, 1995.

(Continued)

*Primary Examiner*—Jingge Wu
*Assistant Examiner*—Ali Bayat
(74) *Attorney, Agent, or Firm*—O'Shea, Getz & Kosakowski, P.C.

(57) ABSTRACT

A device that receives and processes an image signal for sub-band decomposition of an image includes a first median filter that receives the image signal and processes signal values of pixel locations $(x_0, y_0)$, $(x_0-1, y_0)$, $(x+1, y_0)$, $(x_0, y_0-1)$ and $(x_0, y_0+1)$ of the image signal to provide a first median filter output signal. A second median filter receives the first median filter output signal and processes signal values at pixel locations $(x_0, y_0)$, $(x_0-2, y_0)$, $(x_0+2, y_0)$, $(x_0, y_0-2)$ and $(x_0, y_0+2)$ of the first median output signal to provide a second median filter output signal. A third median filter receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal. A first summer computes the difference between the image signal and the first median filter output signal to provide a first sub-band signal. A second summer computes the difference between the first median filter output signal and the second median filter output signal to provide a second sub-band signal, while a a third summer computes the difference between the second median filter output signal and the third median filter output signal to provide a third sub-band signal.

14 Claims, 5 Drawing Sheets

U.S. PATENT DOCUMENTS

| | | | | |
|---|---|---|---|---|
| 5,490,094 | A | * 2/1996 | Heimburger et al. | 348/607 |
| 5,712,807 | A | 1/1998 | Bangham | 364/724.01 |
| 5,960,123 | A | * 9/1999 | Ito | 382/274 |
| 6,075,875 | A | * 6/2000 | Gu | 382/107 |
| 6,195,132 | B1 | * 2/2001 | Kimura et al. | 348/618 |
| 6,643,406 | B1 | * 11/2003 | Hajjahmad et al. | 382/240 |
| 2002/0048405 | A1 | * 4/2002 | Zandi et al. | 382/232 |
| 2003/0039402 | A1 | * 2/2003 | Robins et al. | 382/275 |

FOREIGN PATENT DOCUMENTS

EP      0 383 814      9/1993

OTHER PUBLICATIONS de Haan et al., "Memory Integrated Noise Reduction IC for Television", IEEE Transactions on Consumer Electronics, vol. 42, No. 2, May 1996.

Blume et al., "Rausch-und Artefaktreduktion", Melvdimeuniouale Sigualverasberiteng, Band 2, 2000.

Rossi. "Digital Techniques For Reducing Television Noise", SMPTE Journal, vol. 87, pp. 134-140, 1978.

Burt et al., "The Laplacian Pyramid as a Compact Image Code", IEEE Transactions On Communications, vol. COM-31, No. 4, 1983.

Claypoole, Jr. et al., "Nonlinear Wavelet Transforms for Image Coding Via Lifting", IEEE Transactions on Image Processing, 1999.

Heijmans et al, "Nonlinear Multiresolution Signal Decomposition Schemes-Part II: Morphological Wavelets", IEEE Transactions on Image Processing, vol. 9, No. 11, 2000.

Piella et al., "Adaptive Lifting Schemes with Perfect Reconstruction", Networks and Algorithms, 2001.

Salembier et al., "Size-Sensitive Multiresolution Decomposition of Images with Rank Order Based Filters", Elsevier Science Publishers B. V., 205-241, 1992.

Cha et al., "Adaptive Morphological Representation of Signals: Polynomial and Wavelet Methods", Multidimenstional Systems and Signal Processing, 8, 249-271, 1997.

Donoho et al., "Nonlinear 'Wavelet Transforms' Based on Median-Interpolation", SIAM Journal on Matho Analysis, vol. 31, No. 5.

Schonfeldes. "Digitale Filter in der Videotechnik", Doci.R. Verfag, 1988.

Rosenfeld et al., "Digital Picture Processing", Academic Press, Second Edition, vol. 1, 1982.

Nichtlineare Bandaufspaltung zur kantenschützenden Rausch- und Störungsbeseitigung. Sep. 1999.

Lee, Jong-Sen. "Digital Image Smoothing and the Sigma Filter," Computer Vision, Graphics, and Image Processing, 24, p. 255-269, 1982.

Lebowsky, Fritz. "Bildschärfeverbesserung von hochaufgelösten Festbildern," Fortschritt-Berichte VDI, Reiche 10, Nr. 265, 1993.

* cited by examiner

DEVICE AND METHOD FOR SUB-BAND DECOMPOSITION OF IMAGE SIGNALS

BACKGROUND OF THE INVENTION

The present invention relates in general to video image processing and in particular to sub-band decomposition of image signals.

Many methods used for local noise reduction are based on the adaptive application of linear local operators to the individual pixels or the signal values of the pixels. Such methods are described by Le, J. S., in the article entitled "*Digital Image Smoothing and the Sigma Filter*", Computer Vision Graphics Image Processing, Vol. 24, pp. 255–269, 1983; in the publication by Tekalp, M. A., entitled "*Digital Video Processing*", Prentice-Hall, 1995; by de Haan, G., T. G. Kwaaitsaal-Spassova, M. Larragy, and O. A. Ojo, in the article entitled "*Memory Integrated Noise Reduction IC for Television*", IEEE Trans. on Consumer Electronics, Vol. 42, No. 2, pp. 175–181, May 1996; and by Schröder, H. and H. Blume in the publication entitled "*Mehrdimensionale Signalverarbeitung [Multidimensional Signal Processing]*", Vol. 2, B. G. Teubner, 2000 for example. This principle of applying linear local operators to individual pixels can be combined only to a limited degree with the image model present (problems occur in particular at the edges of the image) so that the efficiency of this method is limited.

The method described by Lebowski, F. in the publication entitled "*Bildschärfeverbesserung von hochaufgelösten Festbildern [Image Definition Improvement in Still Images]*", VDI Verlag, 1993 uses hierarchical stepwise processing in which threshold values depending on the frequency proportions are set in the signal to control noise reduction.

There are also methods based on sub-band decomposition of the image signal followed by processing of the sub-bands. In past years many papers have centered on the design of appropriate sub-band decomposition methods. The linear decomposition methods include simple linear separating filters, described by Rossi, J. P., in the publication "*Digital Technique for Reducing Television Noise*", SMPTE Journal, Vol. 87, pp. 134–105, March, 1978; there are also pyramid decomposition methods described by Burt, P. J. and E. H. Adelson, in the publication "*The Laplacian Pyramid as a Compact Image Code*", IEEE Trans. on Communications, Vol. 31, pp. 532–540, 1983, and methods based on wavelet decomposition of the signal.

However, linear decomposition methods have only limited usefulness for noise reduction in image signals because of their properties in the edge area. The goal of sub-band decomposition is extraction or filtering out of image elements and features with special properties. When band splitting occurs, the use of linear filters leads to sub-bands that differ in the frequency components they contain. This type of signal splitting is cumbersome, particularly in the case of sub-band decomposition for noise reduction, as typical image contents consist of a great many edges as well as other elements, and these edges in turn are composed of many different frequency components. The result is that the signal components of an edge enter many different bands, making it difficult to distinguish between noise and signal components. Because of this, either no noise reduction is accomplished in the edge area or signal components of the edge are recognized as noise and are accordingly removed from the signal.

These problems do not occur in nonlinear sub-band decomposition in which the edges of an image signal are not broken down into many small portions but stay together in one sub-band. Such nonlinear sub-band decomposition using a filter bank with median filters is described for example by Salembier, P. and M. Kunt, in the publication "*Size-sensitive Multiresolution Decomposition of Images with Rank Order Based Filters Signal Processing*", Vol. 27, No. 2, pp. 205–241, 1992 and explained further with reference to FIG. 1. The basic design and function of a median filter is described for example by Helmut Schönfelder, in the publication "*Digitale Filter in der Videotechnik [Digital Filters in Video Technology]*", Drei-R-Verlag, Berlin, 1988, pp. 125–127. Quadratic median filters for image processing are described for example by Rosenfeld, Kak, in "*Digital Picture Processing*", Academic Press, Inc., $2^{nd}$ edition, 1982, pp. 261–263.

Filter 10 illustrated in FIG. 1 has K quadratic median filters 12 of increasing sizes, which each receive the image signal S(x, y). The K median filters 12 have different filter lengths or filter sizes so that when determining the output signal value of a given pixel, the filters 12 consider the signal values of different numbers of pixels from the environment of the given pixel. The filter length and filter size increase with the number K of median filters 12 used.

At the output of the filter 10, K+1 signals are available, corresponding to decomposition of the image signal into K+1 sub-bands. These K+1 signals comprise the output signal of the K-th median filter 12, difference signals formed from the output signals of the adjacent median filters 12, and a difference signal formed from the original image signal and the output signal of the first median filter 12.

The signal at the output of each of the median filters 12 is characterized in that it contains the original image signal in which image features with half the size of the median filter 12 are suppressed. In addition, the noise output in the image signal is reduced by the use of the median filters 12. For the filter 10 illustrated in FIG. 1, this means that the signals at the output of the median filters 12 contain fewer and fewer image features as K increases and are increasingly free of noise. Formation of the difference of the output signals of the median filters 12 thus leads to output signals of the total filter 10 that contain only image features that can just pass the smaller of the two median filters 12 from whose output signals a difference signal is formed but which are already suppressed by the larger of the two median filters 12. The output signals of the total filter 10 also contain noise portions, which contribute in this size range, but which are strongly limited in their amplitude.

In summary, at the output of the filter 10 illustrated in FIG. 1 are signals that each represent a sub-band of the frequency spectrum of the image signal and that each correspond to image elements of different sizes and still have noise components with a low amplitude when the image signal is noisy.

The disadvantage of the band splitting illustrated in FIG. 1 using parallel median filters 12 of different lengths is that the size of the filter mask increases with the number K of the median filters 12, namely with the number of stages. It has been proposed for example that the size of a quadratic filter mask be allowed to increase exponentially with the number of stages. However this makes determination of the median values rather expensive.

To reduce this expenditure, a proposal has been made to reduce the necessary filter size and data volume by stepwise sub-scanning of the signals. Non-linear pyramid decompositions are described by Cha, H. and L. F. Chaparro, in the publication "*Adaptive Morphological Representation of Signals: Polynomial and Wavelet Methods*", Multidimensional Systems and Signal Processing, Vol. 8, pp. 249–271, 1997, and by Donoho, D. I. and T. P. Y. Yu, in the publication entitled, "*Nonlinear 'Wavelet Transforms' Based on Median Interpolation*", SIAM Journal on Math. Anal., Vol. 31, No. 5, which are based on median filters and morphological operators. However, noise reduction based on pyramid decomposition has the disadvantage that these methods are not shift-invariant so that the resulting image contains phase-dependent noise. Moreover, a polynomial approximation is proposed in the cited references for synthesis of the pyramid signals, which has the same problems in the edge area as is the case with the linear sub-band decomposition method.

Other methods for nonlinear sub-band decomposition that have better properties than linear sub-band decomposition filters in the edge area include not only sub-band decomposition using median filters but also wavelet decomposition with signal-adaptive lifting, described for example by Claypoole, R. L., G. Davis, W. Sweldens, and R. Baraniuk, "*Nonlinear Wavelet Transforms for Image Coding via Lifting*", submitted to IEEE Transactions on Image Processing, 1999; by Heijmans, H. J. A. M. and J. Goutsias, in the article entitled "*Nonlinear Multiresolution Signal Decomposition Schemes: Part II: Morphological Wavelets*", IEEE Trans. on Image Processing, Vol. 9, No. 11, 2000; and by Piella, G. and N. J. A. M. Heijmans, in the publication entitled "*Adaptive Lifting Schemes with Perfect Reconstruction*", Research Report PNA-R0104, Centrum voor Wiskunde en Informatica (CWI), 2001. Because of the high expenditure and the properties of the sub-bands, these methods have limited usefulness for sub-band decomposition, namely dividing the image signal into various sub-signals that represent different frequency bands of the image signal.

What is needed is an improved technique for sub-band decomposition of image signals.

SUMMARY OF THE INVENTION

An aspect of the invention is based on cascading of median filters. A device according to an aspect of the invention has a cascade with n sequential median filters, each of which has an input and an output, where $n \geq 2$ and where the image signal is fed to the input of a first median filter and where the input of each median filter following the first median filter is connected to the output of the previous median filter in the cascade. To form sub-band signals from output signals of the median filter, linking elements are provided, each of which has two inputs and one output, where an output signal of one of the median filters or the image signal is fed to each of the linking element inputs and where a sub-band signal is available at the linking element output.

In one embodiment, n linking elements are present. The image signal is fed to a first linking element together with an output signal of a first median filter, while output signals from two median filters each are fed to the other linking elements. These two median filters, whose output signals are fed to a linking element, are, in another embodiment of the invention, two sequential median filters in the cascade.

The linking elements preferably include a first subtractor that subtracts the output signal of the first filter from the image signal, and a second subtractor that subtracts the output signal from a second median filter from the output signal of the first filter. As well as the output signals of the n subtractors, the last median filter also delivers a sub-band signal in the cascade, so that with an arrangement with n median filters and n subtractors, n+1 sub-band signals can be produced.

As known and explained for example by Helmut Schönfelder, in the publication "*Digitale Filter in der Videotechnik [Digital Filters in Video Technology]*", Drei-R-Verlag, Berlin, 1988, pp. 125–127 and by Rosenfeld, Kak in the publication "*Digital Picture Processing*", Academic Press, Inc., $2^{nd}$ edition, 1982, pp. 261–263, in a median filter for forming a filter output signal value for a pixel, as well as the input signal value of this pixel, the signal values of other pixels are taken into consideration, with the signal values being sorted by size and the average signal value of the sorted signal value sequence being output as the filter output value. Median filters have the property that edge progressions in an image remain after the image signal has been filtered with a median filter, but without image features, meaning that delimited image areas can be masked out (i.e., "filtered out") depending on the filter size. Here, the filter size denotes the number of signal values taken into consideration upon filtering.

In one embodiment, the median filters are designed in such a way that when an output value is determined for a pixel, not only the input signal value for this pixel but also input values of pixels disposed in a cruciform arrangement around this pixel are taken into consideration, with the axes of the cross extending from the pixel in the horizontal and vertical directions on both sides of the pixel. Consideration of input values of pixels that lie on the axes of a cross instead of consideration of all the pixels that lie for example in a square or a circle around a particular pixel reduces the cost of implementing the filter and the computing burden. Median filters can be used that consider the pixels that lie in an annular arrangement around the pixel for which a filter output value is calculated.

With the cascading according to the invention it is possible, when producing a filter output value for a given pixel, for the median filters to consider the signal values of pixels whose distance from the given pixel differs from filter to filter. In this way, image features of different sizes can be filtered in the individual filter stages.

In one embodiment in which the pixels taken into consideration are disposed in a cross around a given pixel, the cascading according to the invention makes it possible, when producing a filter output value for a given pixel, for the median filters to consider the signal values of pixels whose distance in the vertical and horizontal directions from the given pixel differs from filter to filter without however increasing the computing burden and expense when implementing the median filter from filter to filter in the cascade. Thus, in one embodiment of the invention, as well as the input signal value of a given pixel, the signal values of four pixels are taken into consideration, the four pixels lying on the axes of a cross whose point of intersection is at the given pixel and which extend for equal distances from the given pixel in the four axial directions.

In this case the distance of the pixels taken into consideration, which are disposed symmetrically around the given pixel, increases from filter to filter in the cascade.

Each of these median filters attenuates image features with specific dimensions, with these dimensions being dependent on the distance of the pixels considered by the median filters from the given pixel. The cascaded median filters are so constructed that the size of the image features filtered out through the individual median filters increases from filter to filter in the cascade. Since an output signal of a previous median filter in the cascade is fed to each median filter, with the exception of the first median filter in the cascade, these median filters receive input signals in which the image features filtered out by the previous median filters are no longer retained. Each median filter in the cascade thus has to be designed to filter out only image features with a specific size, which reduces the number of pixels to be taken into consideration in median filtering, as described.

For forming the difference between output signals of sequential median filters, sub-band signals are produced that contain those image features that can still pass through a filter in the cascade and are filtered out by a filter that follows this filter in the sequence.

In the embodiment in which the same number of signal values—of pixels with distances from a given pixel that differ from filter to filter—are used for forming an output signal value in the individual median filters, the image signal can be analyzed by the device according to the invention in terms of image features with different sizes without having to increase expenditure in the individual stages/median filters of the cascade. The size of the different image features that can be analyzed depends on the number of median filters in the cascade. The device according to the invention brings about band splitting of the image signal on the basis of cascaded and weighted median filters, with the sub-bands having comparable properties. Signal portions with a size corresponding to the number of stages are separated in the sub-bands in question.

The device according to the invention for sub-band decomposition is particularly suitable for noise suppression in image signals. For this purpose, the sub-band signals are fed to noise suppression units, and output signals from these noise suppression units are added to form a noise-suppressed image signal.

Noise suppression is accomplished for example by noise suppression devices that implement a softcoring characteristic, in which signals with an amplitude lying within a given interval are suppressed while other signal values pass through the noise suppression device.

Sub-band decomposition by the device according to the invention leads to signals that, in addition to noise, still contain signal portions of image elements whose size corresponds to the individual median filter dimensions. The fact that with this type of band splitting the image elements can no longer be divided into several sub-bands in linear band splitting, but remain largely in just one band with full edge steepness, allows simple distinction between useful signals and noise, based on signal amplitude. Moreover, the signals of the sub-bands in areas where there is no signal portion have an expected value of zero. As a result, noise reduction can be simply accomplished by a noise suppression device with a coring characteristic.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
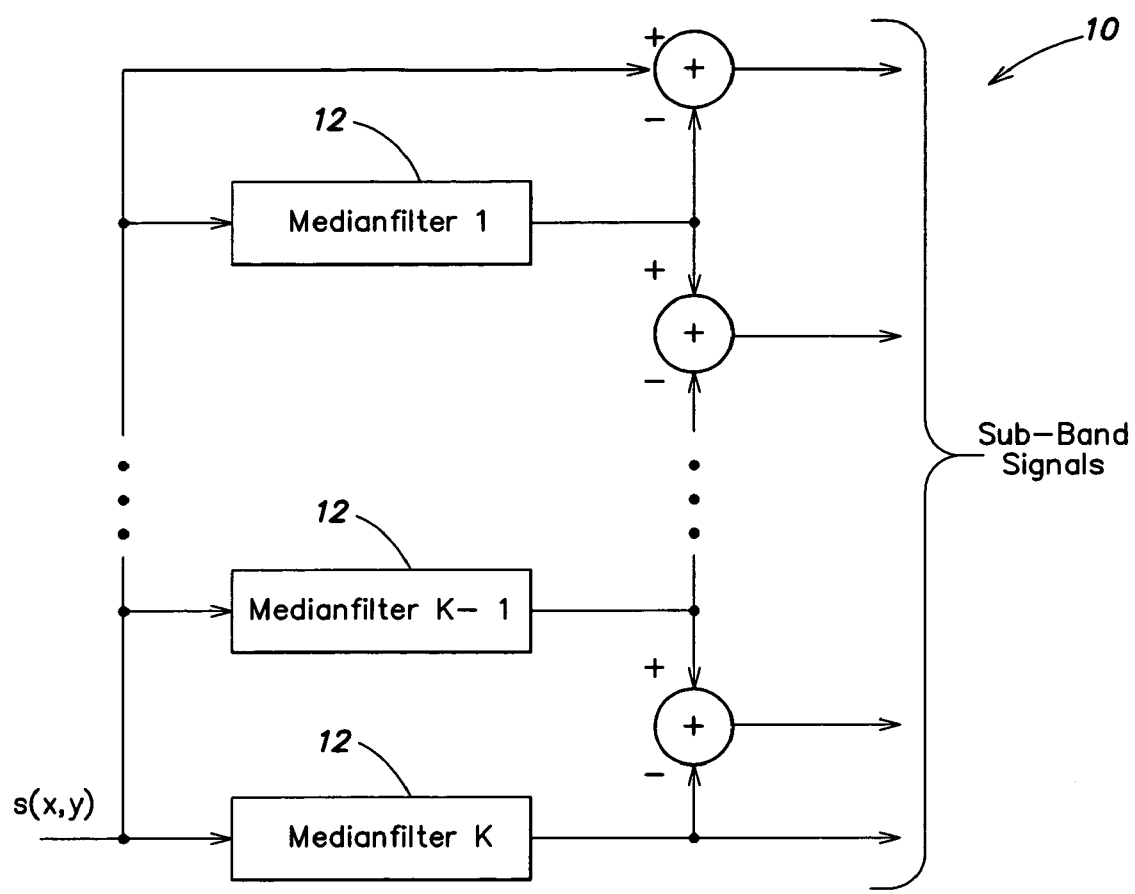
FIG. 1 is a block diagram illustration of a prior art device for sub-band decomposition.
Figure 2:
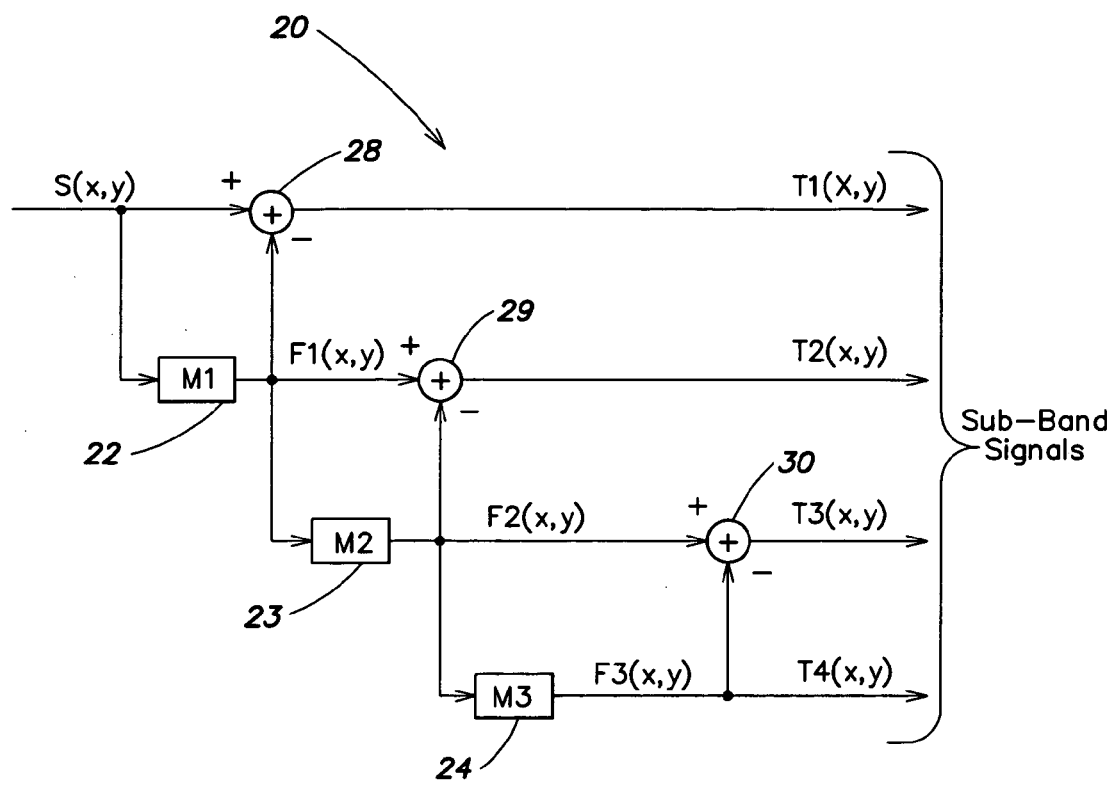
FIG. 2 is a block diagram illustration of a device for sub-band decomposition with cascaded median filters.

FIG. 2 illustrates one example of a device 20 according to the invention for sub-band decomposition of an image signal $S(x,y)$. The device 20 has a cascade arrangement of n median filters 22, 23, 24, with n=3 in the example of FIG. 2. The image signal $S(x,y)$ input to a first median filter 22. Each of the subsequent median filters 23, 24 following the first median filter 22 receives the output of the previous median filter 22, 23. For example, output signal $F1(x,y)$ of the first median filter 22 is input to the second median filter 23 and an output signal $F2(x,y)$ of the second median filter 23 is input to the third median filter 24.

The device 20 also has three subtractors 28–30, which provide sub-band signals $T1(x,y)$, $T2(x,y)$, $T3(x,y)$ respectively. Another sub-band signal $T4(x,y)$ is available at the output of the third or last median filter 24 in the cascade. The first subtracter 28 forms the first sub-band signal $T1(x,y)$ from the difference of the image signal $S(x,y)$ and the output signal $F1(x,y)$ of the first median filter 22. The sub-band signals $T2(x,y)$, $T3(x,y)$ are formed correspondingly from the differences of the output signals $F1(x,y)$, $F2(x,y)$, $F3(x,y)$ of the sequential median filters 22 24.

Figure 3:
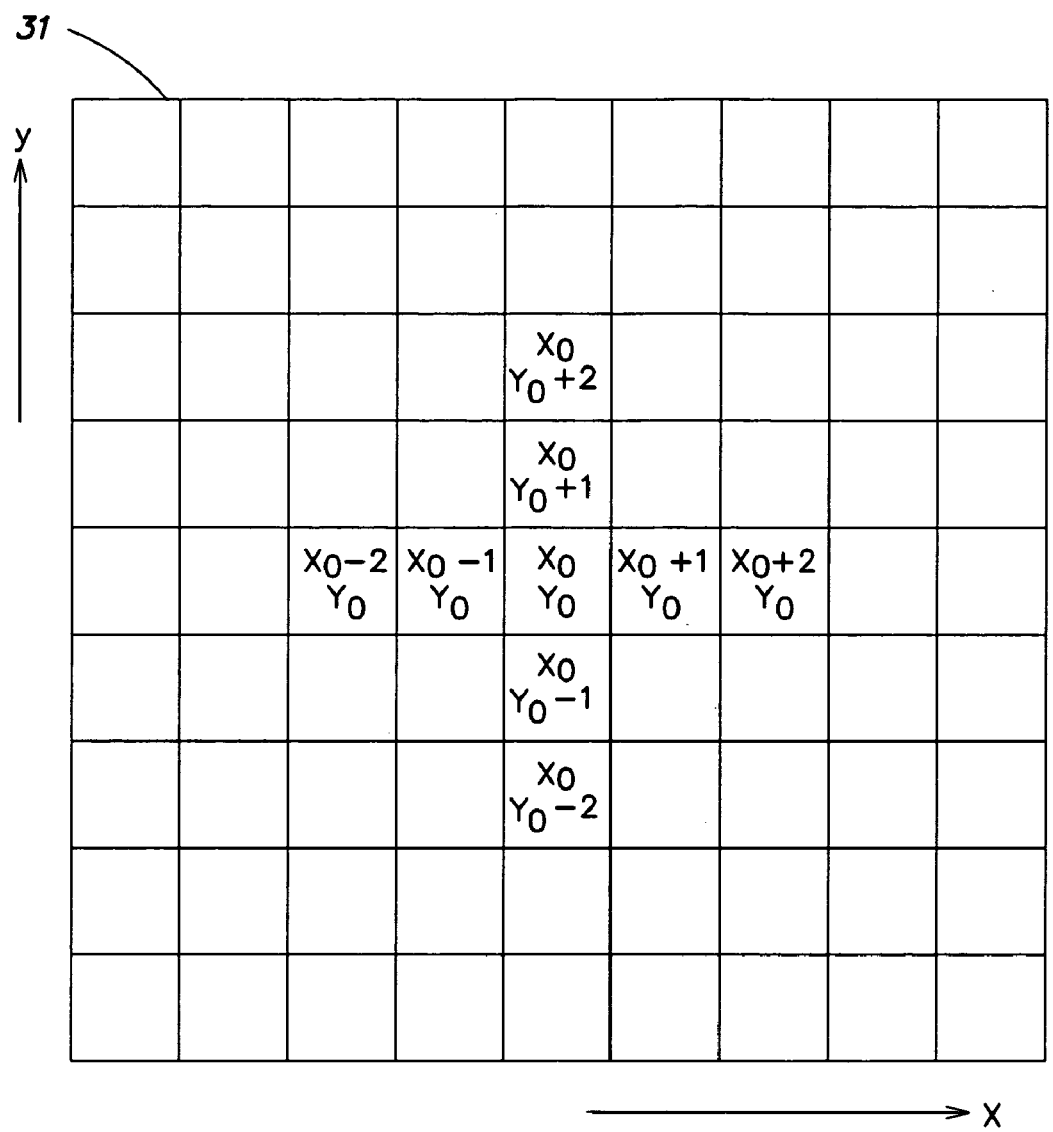
FIG. 3 illustrates a rectangular section of an image area.

The operation of the median filters 22–24 is described with reference to a rectangular section of an image 31 illustrated in FIG. 3. The image 31 includes a plurality of pixels determined by their coordinates in the horizontal direction (x direction) and in the vertical direction (y direction) and to each of which a signal value is assigned. The assigned signal value can have a brightness value or a chrominance value. The image signal $S(x,y)$ that is input to the cascade arrangement of the median filters 22–24 contains a sequence of signal values of these pixels. The image signal can be a luminance signal that contains the brightness values or a chrominance signal that contains the chrominance values.

For each signal value $S(x_0,y_0)$ of any given pixel $(x_0,y_0)$ in the image 31, the median filters 22–24 each generate a filter output value where, in addition to the signal value $S(x_0,y_0)$ of this pixel $(x_0,y_0)$, signal values of adjacent pixels $S(x_0 \pm a, y_0 \pm b)$ (where a and b are integers) are considered in the formation of the filter output value. The median filters 22–24 sort the signal values of the pixels considered by size and output the average of the size-sorted signal values as the filter output values.

As will be further described below, the cascade arrangement of the median filters 22–24 enables median filters to be used that consider not only the signal value of a certain pixel $(x_0,y_0)$ but also other pixels whose distance from the pixel $(x_0,y_0)$ increases from filter to filter.

In one embodiment, the median filters 22–24 are such that when an output value for a certain pixel $(x_0,y_0)$ is generated, as well as the signal value $S(x_0,y_0)$ of this pixel, the filters 22–24 consider those pixels that arise from a cruciform pixel arrangement around the pixel $(x_0,y_0)$, namely the signal values for pixels that lie on two straight lines passing through the pixel $(x_0,y_0)$, these lines in particular being a horizontal line with pixels $(x_0 \pm a, y_0)$ and a vertical line with pixels $(x_0, y_0 \pm b)$.

In one embodiment, four additional pixels are considered that are the same distance from the pixel on the axes of the cruciform arrangement. The distance of the pixels considered from the pixel $(x_0,y_0)$ differ between the filters 22–24 from filter to filter and increasing between the filters 22–24 from filter to filter starting at the first median filter 22 to which the image signal is fed.

Figure 4:
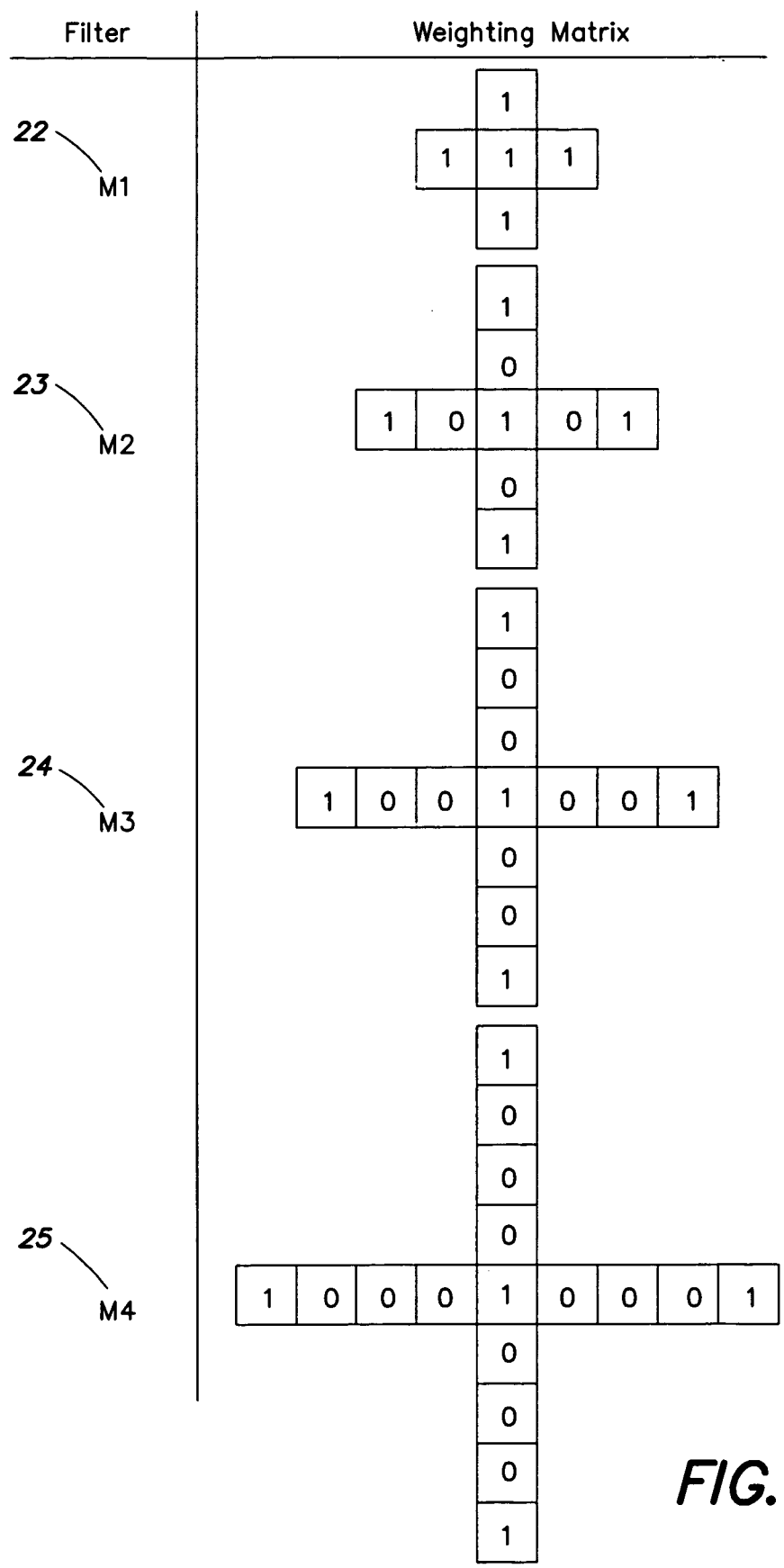
FIG. 4 illustrates the coefficients of the individual median filters in the cascade based on a weighting matrix.
Figures 5, 6:
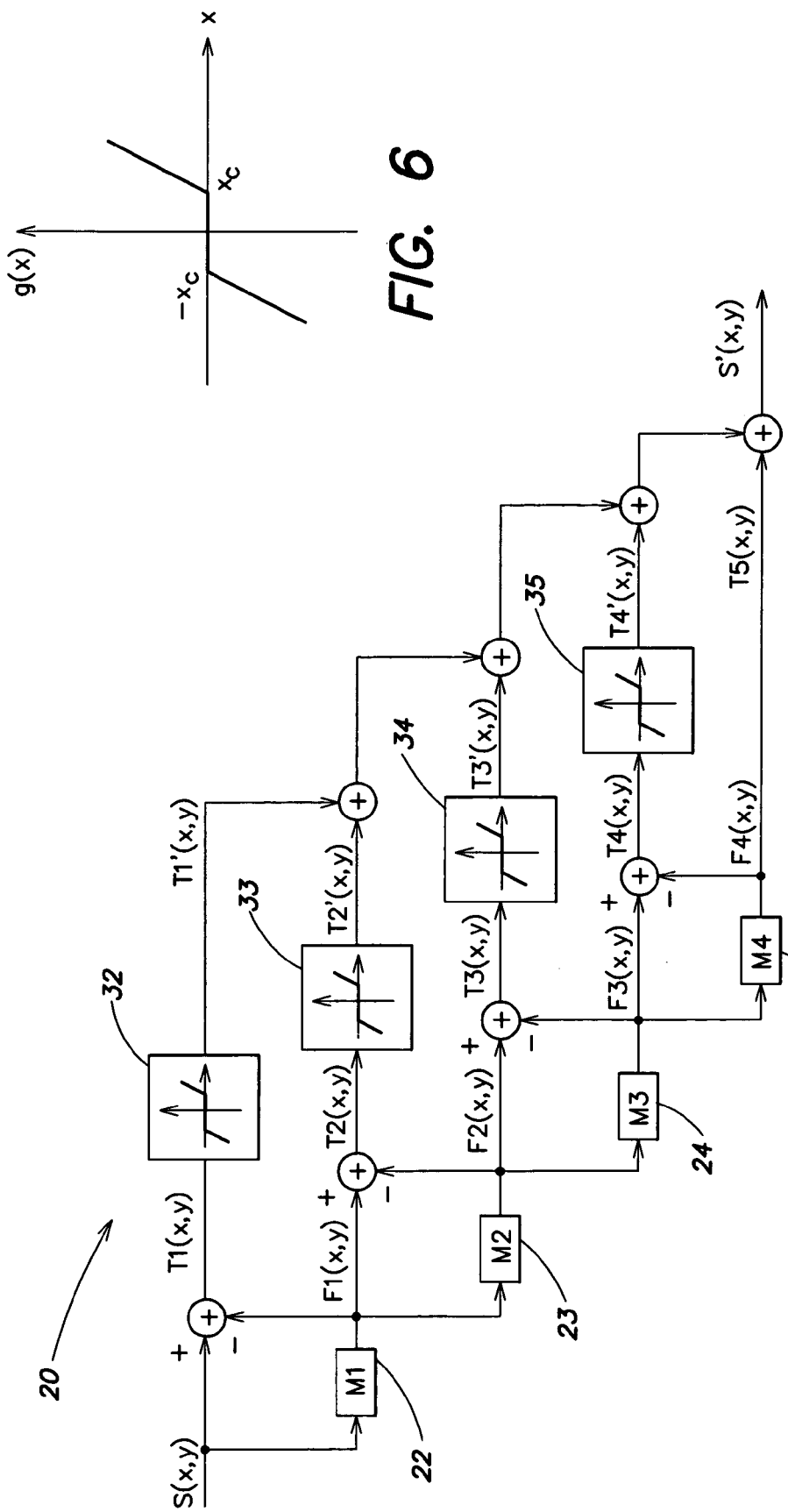
FIG. 5 is a block diagram illustration of a device for noise suppression in an image signal that has a device for sub-band decomposition and noise suppression units, to which sub-band signals are fed.
FIG. 6 is a graph of a noise suppression unit of FIG. 5.

With reference to FIG. 4, examples of weighting matrices of the median filters 22–24 are explained in the cascade arrangement of the median filters 22–25 according to the invention, as illustrated for example in FIGS. 2 and 5.

A weighting matrix in the present case generally indicates the pixels whose signal values are considered in median filtering and how the signal values of these pixels are to be weighted before filtering, that is, before the size-sorting.

In the example illustrated in FIG. 4, the matrices have at the outer ends of a cruciform arrangement weighting factors that are non-zero. That is, pixels of a cruciform arrangement are considered in filtering that have weighting factors of zero outside the cross. The weighting factor at the intersection represents the weighting of the signal value of a given pixel, for example of the pixel $(x_0,y_0)$ according to FIG. 3, for which a filter output value is generated. The remaining weighting factors represent the weighting factors for other pixels considered in median filtering.

The first median filter 22 with a filter matrix according to FIG. 4 considers, when forming the output value, not only the signal value of a pixel $(x_0,y_0)$ but also the signal values of the pixels $(x_0+1,y_0)$, $(x_0-1,y_0)$, $(x_0,y_0+1)$, and $(x_0,y_0-1)$, namely signal values removed by one pixel on the axes from the pixel $(x_0,y_0)$.

If the signal value of the pixel $(x_0,y_0)$ is distinguished from the signal values of the pixels surrounding it, namely the pixels $(x_0+1,y_0)$, $(x_0-1,y_0)$, $(x_0,y_0+1)$, and $(x_0,y_0-1)$, the signal value of the pixel $(x_0, y_0)$ in the output signal is replaced by the signal value of one of the pixels $(x_0+1,y_0)$, $(x_0-1,y_0)$, $(x_0,y_0+1)$, and $(x_0,y_0-1)$ by median filtering. An image feature—that is an image area of delimited size distinguished from the environment—that covers one pixel, is thus suppressed or filtered out by the first median filter, while image features larger than the size of one pixel are not filtered out.

The first sub-band signal $T1(x,y)$ according to FIG. 2, formed from the difference of the image signal $S(x,y)$ and the first filter signal $F1(x,y)$, thus contains image features the size of one pixel, while the signal portions of larger image features that are also still contained in the first filter signal $F1(x,y)$ are distinguished by difference formation.

The second median filter 23 considers, when forming the output value, not only the signal value of the pixel $(x_0,y_0)$, but also the signal values of the pixels $(x_0+2, y_0)$, $(x_0-2, y_0)$, $(x_0, y_0+2)$, and $(x_0, y_0-2)$, namely signal values that are two pixels distant from the pixel $(x_0,y_0)$ on the axes. The second median filter 23 filters out image features that have a vertical and horizontal size of two or fewer pixels. The second sub-band signal $T2(x,y)$, which according to FIG. 2 is formed from the difference of the first filter signal $F1(x,y)$ and the second filter signal $F2(x,y)$, thus contains image features that are the size of two pixels, while the signal portions of larger image features that are still contained in both the first filter signal $F1(x,y)$ and the second filter signal $F2(x,y)$ are distinguished by difference formation. Image features with a size of one pixel are not contained in the second sub-band signal $T2(x,y)$, as these have already been filtered out by the first median filter 22.

The third median filter 24 considers, when forming the output value, the signal value of the pixel $(x_0,y_0)$ along with the signal values of the pixels $(x_0+3, y_0)$, $(x_0-3, y_0)$, $(x_0, y_0+3)$, and $(x_0, y_0-3)$, namely signal values that are three pixels distant from the pixel $(x_0,y_0)$ on the axes. The fourth median filter 25 (FIG. 5) considers, when forming the output value, the signal value of the pixel $(x_0,y_0)$ along with the signal values of the pixels $(x_0+4, y_0)$, $(x_0-4, y_0)$, $(x_0, y_0+4)$, and $(x_0, y_0-4)$, namely signal values that are four pixels distant from the pixel $(x_0,y_0)$ on the axes. Thus, the third median filter 24 filters out image features that have a vertical and horizontal size of three pixels or fewer, and the fourth median filter 25 filters out image features that have a vertical and horizontal size of four pixels or fewer. The third sub-band signal $T3(x,y)$, formed from the difference of the second filter signal $F2(x,y)$ and the third filter signal $F3(x,y)$, thus contains image features as large as three pixels, while the signal portions of larger image features that are still contained both in the first filter signal $F1(x,y)$ and in the second filter signal $F2(x,y)$ are distinguished by difference formation. Image details smaller than three pixels are not contained in the third sub-band signal $T3(x,y)$, as these have already been filtered out by the previous median filters 22, 23 in the cascade.

Correspondingly, a fourth sub-band signal contains image features the size of four pixels, while the signal portions of larger image features are distinguished by difference formation. Image features smaller than four pixels are not contained in the fourth sub-band signal, as these have already been filtered out by the previous median filters 22–24 in the cascade.

All the image features larger than three or four pixels are contained in the output signal of the last median filter (i.e., of the filter 24 in FIG. 2 and of the filter 25 in FIG. 5), which is output as the respective sub-band signal. In general, in a cascade with n median filters, n+1 sub-band signals can be generated, each of which contains image features with a specific size. To reduce the computing burden, each median filter 22–25 considers not only the signal value $S(x_0,y_0)$ of the pixel $(x_0,y_0)$, but also preferably the signal values of four other pixels $(x_0+k,y_0)$, $(x_0-k,y_0)$, $(x_0,y_0+k)$, and $(x_0,y_0-k)$, where k is an integer and the distance k from two sequential median filters preferably differs by one. The size of the image features suppressed by the corresponding filter is k. The distance of the pixels considered by median filtering from the pixel for which a filter output value was determined in the corresponding filtering step increases from filter to filter preferably by one pixel, so that the image features filtered out from filter to filter differ in dimensions by one pixel each.

Based on the difference formation between two filter output signals, to form a sub-band signal, each sub-band signal contains those image features that still pass through a filter in the cascade and are filtered out by the next filter in the cascade.

One embodiment provides that the pixel values considered in median filtering when generating the output signal are differently weighted before size-sorting. Thus, the signal value of the central pixel $(x_0,y_0)$ is more strongly weighted than the surrounding pixels $(x_0+k,y_0)$, $(x_0-k,y_0)$, $(x_0,y_0+k)$, and $(x_0,y_0-k)$.

The cascading of the median filters 22–25 makes it possible for the individual median filters to be designed for filtering those image features that are still contained in the filter input signal and have not yet been filtered out by the previous median filters. This reduces the circuitry burden or computing burden for the individual filters and makes it possible to use weighting matrices in which the distance of the pixels considered increases from filter to filter in the cascade starting from the first filter 22 without increasing the number of pixels considered in the cruciform arrangement of FIG. 4.

Any additional weighting matrices can be used in which the distance of the pixels considered in median filtering from a certain pixel increases from filter to filter. As well as pixels lying on a cross with horizontal and vertical axes as illustrated in FIG. 4, the pixels can lie in any position in a cruciform arrangement, for example on a diagonal cross. With a diagonal cross, the signal value of the pixel $(x_0,y_0)$, and the signal values of the pixels $(x_0+k,y_0+k)$, $(x_0+k,y_0-k)$, $(x_0-k,y_0+k)$, and $(x_0-k,y_0-k)$ are considered.

Furthermore, the pixels considered in median filtering can also be disposed annularly around the pixel $(x_0,y_0)$, in which case the ring can have any shape (particularly approximately round or rectangular) and where the distance of the ring from the pixel $(x_0,y_0)$ for which a filter output value is determined increases from filter to filter. In this embodiment, the number of pixels considered increases from filter to filter because the size of the ring increases.

The device 20 according to the invention that brings about splitting of the image signal into the sub-band signals containing image features with different resolutions is particularly suitable for use in a device for noise suppression. Such a device 20 is illustrated in FIG. 5.

The device 20 has a cascade with n=4 median filters 22–25 which in particular can have a weighting matrix of the type described above. The filter output signals F1, F2, F3, F4 S are input to noise suppression units 32–35, respectively. The noise suppression units 32–35 provide noise-suppressed sub-band signals T1'(x,y), T2' (x,y), T3' (x,y), and T4' (x,y) respectively, which are summed up along with the filter output signal F4(x,y) of the last median filter 25 in the cascade to produce a noise-suppressed image signal S'(x,y).

The noise suppression units 32–35 have for example a transfer curve with the shape illustrated in FIG. 6. For an output signal g(x):

$$g(x) = \begin{cases} x - x_c & \text{for } x > x_c \\ 0 & \text{for } -x_c \leq x \leq x_c \\ x + x_c & \text{for } x < x_c \end{cases}$$

Signals with an amplitude less than $x_c$ are thus suppressed as they are assumed to be noise signals.

This noise suppression technique is particularly effective for the sub-band signals that are obtained by the device for sub-band decomposition. The sub-band decomposition then leads to signals that contain not only noise but also signal portions of image elements or image features whose size corresponds to the median filter sizes in question, namely the distance between the central pixel $(x_0,y_0)$ and the pixels are also taken into consideration. The fact that, by this type of band splitting, the image elements are no longer divided up into multiple sub-bands as in the case of linear band splitting but largely remain in just one band with full edge steepness makes it easy to distinguish between useful signals and noise based on the signal amplitude. Moreover, the signals of the sub-bands in areas where there is no signal portion have an expected value of zero. As a result, noise suppression can be accomplished by using a coring characteristic, as illustrated in FIG. 6. Research in this connection has shown that the use of a softcoring characteristic with softcoring gives very good results. The choice of the threshold value $x_c$ is governed by the scatter in the individual sub-bands. Here, the threshold values should not exceed twice the value of the noise scatter in the corresponding band. Noise reduction is achieved in particular by the noise components in the difference bands having small signal amplitudes while the image elements with this type of splitting have large amplitudes.

To summarize, the device 20 according to an aspect of the invention makes effective sub-band decomposition possible at relatively low cost. The reduction in expenditure for determining the output values of the individual median filters 22–25 in the cascade is achieved by having the individual median filter stages consider as few input values as possible by appropriate weighting, as explained above.

Any other median filters 22–25 that are orthogonal to each other can be used as median filters, in which the previous median filters 22–25 in the cascade pass signal portions that are filtered out only by a following filter in the cascade.

The cascading of the median filters 22–25 makes it possible for the individual median filters to be designed only for filtering those image features that are definitely still contained in the filter input signal, namely that have not yet been filtered out by the previous median filters. This reduces the circuitry burden or computing burden for the individual filters.

Although the present invention has been shown and described with respect to several preferred embodiments thereof, various changes, omissions and additions to the form and detail thereof, may be made therein, without departing from the spirit and scope of the invention.

What is claimed is:

1. A device that receives and processes an image signal for sub-band decomposition of an image, the device comprising:
    a first median filter that receives the image signal and processes signal values of pixel locations $(x_0, y_0)$, $(x_0+1, y_0)$, $(x+1, y_0)$, $(x_0, y_0-1)$ and $(x_0, y_0+1)$ of the image signal to provide a first median filter output signal;
    a second median filter that receives the first median filter output signal and processes signal values at pixel locations $(x_0, y_0)$, $(x_0-2, y_0)$, $(x_0+2, y_0)$, $(x_0, y_0-2)$ and $(x_0, y_0+2)$ of the first median output signal to provide a second median filter output signal;
    a third median filter that receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal;
    a first subtractor that computes the difference between the image signal and the first median filter output signal to provide a first sub-band signal;
    a second subtractor that computes the difference between the first median filter output signal and the second median filter output signal to provide a second sub-band signal; and
    a third subtractor that computes the difference between the second median filter output signal and the third median filter output signal to provide a third sub-band signal;
    where each of the median filters considers not only the signal value at the pixel location $(x_0,y_0)$ but also the signal values of four other pixels $(x_0k,y_0)$, $(x_0-k,y_0)$, $(x_0,y_0+k)$, and $(x_0,y_0-k)$ which, in a cruciform arrangement, are at the same distance from pixel $(x_0,y_0)$ in the horizontal and the vertical direction.

2. A device that receives and processes an image signal for sub-band decomposition of an image, the device comprising:
    a first median filter that receives the image signal and processes signal values of pixel locations $(x_0, y_0)$, $(x_0-1, y_0)$, $(x+1, y_0)$, $(x_0, y_0-1)$ and $(x_0, y_0+1)$ of the image signal to provide a first median filter output signal;
    a second median filter that receives the first median filter output signal and processes signal values at pixel locations $(x_0, y_0)$, $(x_0-2, y_0)$, $(x_0+2, y_0)$, $(x_0, y_0-2)$ and $(x_0, y_0+2)$ of the first median output signal to provide a second median filter output signal;
a third median filter that receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal;
a first summer that computes the difference between the image signal and the first median filter output signal to provide a first sub-band signal;
a second summer that computes the difference between the first median filter output signal and the second median filter output signal to provide a second sub-band signal; and
a third summer that computes the difference between the second median filter output signal and the third median filter output signal to provide a third sub-band signal.

3. The device of claim 2, comprising a summer that sums the first, second and third sub-band signals with the third median filter output signal to provide a filtered image signal.

4. The device of claim 2, comprising:
a first deadband filter that receives the first sub-band signal and provides a first sub-band filtered signal;
a second deadband filter that receives the second sub-band signal and provides a second sub-band filtered signal;
a third deadband filter that receives the third sub-band signal and provides a third sub-band filtered signal; and
a summer that sums the first, second and third sub-band filtered signals and the third median filter output signal to provide a filtered image signal.

5. The device of claim 4, wherein the first deadband filter has a response such that when the input signal value has an amplitude less than $x_c$ then the first sub-band filtered signal is set equal to zero.

6. A device that receives and processes an image signal for sub-band decomposition of an image, the device comprising:
a first median filter that receives the image signal and processes signal values of pixel locations $(x_0, y_0)$, $(x_0-1, y_0)$, $(x+1, y_0)$, $(x_0, y_0-1)$ and $(x_0, y_0+1)$ of the image signal to provide a first median filter output signal;
a second median filter that receives the first median filter output signal and processes signal values at pixel locations $(x_0, y_0)$, $(x_0-2, y_0)$, $(x_0+2, y_0)$, $(x_0, y_0-2)$ and $(x_0, y_0+2)$ of the first median output signal to provide a second median filter output signal;
a third median filter that receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal;
means for computing the difference between the image signal and the first median filter output signal and for deadband filtering the resulting difference to provide a first sub-band signal;
means for computing the difference between the first median filter output signal and the second median filter output signal and for deadband filtering the resulting difference to provide a second sub-band signal;
means for processing the first and second sub-band filtered signals to provide a filtered image signal.

7. The device of claim 6, further comprising:
a third median filter that receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal;
means for computing the difference between the second median filter output signal and the third median filter output signal and for deadband filtering the resulting difference to provide a third sub-band signal; and
wherein the means for processing comprises a summer that sums the first, second and third sub-band signal and the third median filter output signal to provide the filtered image signal.

8. A device that receives and processes an image signal for sub-band decomposition of an image, the device comprising:
a first median filter that receives the image signal and processes signal values of pixel locations $(x_0, y_0)$, $(x_0-1, y_0)$, $(x+1, y_0)$, $(x_0, y_0-1)$ and $(x_0, y_0+1)$ of the image signal to provide a first median filter output signal;
a second median filter that receives the first median filter output signal and processes signal values at pixel locations $(x_0, y_0)$, $(x_0-2, y_0)$, $(x_0+2, y_0)$, $(x_0, y_0-2)$ and $(x_0, y_0+2)$ of the first median output signal to provide a second median filter output signal;
a third median filter that receives the second median filter output signal and processes signal values at pixel locations $(x_0, y_0)$, $(x_0-3, y_0)$, $(x_0+3, y_0)$, $(x_0, y_0-3)$ and $(x_0, y_0+3)$ of the second median filter output signal to provide a third median filter output signal;
a first summer that computes the difference between the image signal and the first median filter output signal to provide a first sub-band signal;
a second summer that computes the difference between the first median filter output signal and the second median filter output signal to provide a second sub-band signal; and
a third summer that computes the difference between the second median filter output signal and the third median filter output signal to provide a third sub-band signal.

9. A device that receives and processes an image signal for sub-band decomposition of an image, the device comprising:
a first median filter that receives the image signal and processes signal values of pixel locations $(x_0, y_0)$, $(x_0-A, y_0-A)$, $(x-A, y_0+A)$, $(x_0+A, y_0-A)$ and $(x_0+A, y_0+A)$ of the image signal to provide a first median filter output signal;
a second median filter that receives the first median filter output signal and processes signal values at pixel locations $(x_0, y_0)$, $(x_0-B, y_0-B)$, $(x_0-B, y_0+B)$, $(x_0+B, y_0-B)$ and $(x_0+B, y_0+B)$ of the first median output signal to provide a second median filter output signal;
a third median filter that receives the second median filter output signal and processes signal values at pixel locations $(x_0, y_0)$, $(x_0-C, y_0-C)$, $(x_0-C, y_0+C)$, $(x_0+C, y_0-C)$ and $(x_0+C, y_0+C)$ of the second median filter output signal to provide a third median filter output signal, where A, B and C integers;
a first summer that computes the difference between the image signal and the first median filter output signal to provide a first sub-band signal;
a second summer that computes the difference between the first median filter output signal and the second median filter output signal to provide a second sub-band signal; and
a third summer that computes the difference between the second median filter output signal and the third median filter output signal to provide a third sub-band signal.

10. The device of claim 9, wherein B is equal to (A+1) and C is equal to (A+2).

11. The device of claim 10, comprising a summer that sums the first, second and third sub-band signals with the third median filter output signal to provide a filtered image signal.

12. The device of claim 11, wherein the first deadband has a response such that when the input signal value has an amplitude less than $x_c$ then the first sub-band filtered signal is set equal to zero.

13. The device of claim 9, where A is equal to one, B is equal to two and C is equal to three.

14. The device of claim 9, comprising:
a first deadband that receives the first sub-band signal and provides a first sub-band filtered signal;
a second deadband that receives the second sub-band signal and provides a second sub-band filtered signal;
a third deadband that receives the third sub-band signal and provides a third sub-band filtered signal; and
a summer that sums the first, second and third sub-band filtered signals and the third median filter output signal to provide a filtered image signal.

* * * * *